(12) United States Patent
Xu et al.

(10) Patent No.: US 7,546,312 B1
(45) Date of Patent: Jun. 9, 2009

(54) SYSTEM AND METHODS FOR MODELING A REPORT QUERY DATABASE

(75) Inventors: Sarah Yongmei Xu, Westford, MA (US); Serge Marokhovsky, Upton, MA (US); Christopher A. Chaulk, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 341 days.

(21) Appl. No.: 11/233,811

(22) Filed: Sep. 23, 2005

(51) Int. Cl.
*G06F 17/30* (2006.01)

(52) U.S. Cl. .................. 707/103 R; 707/2; 707/3; 707/102; 709/210; 709/213

(58) Field of Classification Search ............ 707/103 R, 707/2, 3, 102; 709/210, 213
See application file for complete search history.

(56) References Cited

U.S. PATENT DOCUMENTS

| | | | | |
|---|---|---|---|---|
| 5,428,776 A * | 6/1995 | Rothfield | ................... | 707/4 |
| 5,511,190 A * | 4/1996 | Sharma et al. | ................ | 707/1 |
| 5,701,453 A * | 12/1997 | Maloney et al. | ................ | 707/2 |
| 5,848,408 A * | 12/1998 | Jakobsson et al. | .............. | 707/3 |
| 5,918,232 A * | 6/1999 | Pouschine et al. | ........ | 707/103 R |
| 6,442,566 B1 * | 8/2002 | Atman et al. | ........ | 707/103 R |
| 7,289,997 B1 * | 10/2007 | Kita et al. | ................ | 707/100 |
| 2004/0122844 A1 * | 6/2004 | Malloy et al. | ................ | 707/102 |
| 2005/0119996 A1 * | 6/2005 | Ohata et al. | ................ | 707/3 |
| 2006/0026180 A1 * | 2/2006 | Kres | ................ | 707/100 |
| 2006/0031187 A1 * | 2/2006 | Pyrce et al. | ................ | 707/1 |
| 2006/0085166 A1 * | 4/2006 | Ochi et al. | ................ | 702/186 |

* cited by examiner

*Primary Examiner*—Hosain Alam
*Assistant Examiner*—Syling Yen
(74) *Attorney, Agent, or Firm*—Chapin IP Law, LLC; Barry W. Chapin, Esq.

(57) ABSTRACT

A Decision Support System (DSS) coalescer offloads and transforms data from an online statistical gathering database to a report query database adapted for report generation. The coalescer generates and populates a query database structured for query data retrieval, in contrast to realtime access transaction storage as in the online database. Configurations transform the online database into a star join schema (table structure) that centralizes database "facts" in a central table and forms associations to database "dimensions" upon which a query is likely to be based. The facts refer to items which tend to change regularly over time, such as sales volumes and unit shipped. Conversely, the dimensions include more static values such as time (e.g. days, weeks, and quarters) and geographic regions, such as states and countries. The resulting query model (schema) includes relatively small dimensions tables associated with (i.e. having a schema association to) a relatively larger fact table.

22 Claims, 10 Drawing Sheets

```
502
  \<job_group name="srm_array_dimension_tables_group_populate">
504   <job_group_desc>populate srmarray dimension tables</job_group_desc>
  \- <etl_job name="srm_array_populate" enabled="true"
        defaultTargetConn="targetDb"
        defaultSourceConn="sourceDb"
        defaultSourceObject="usingsource" defaultTargetObject="srmarray">
506   <job_desc>populate the srmarray table using merge</job_desc>
  \- <etl_load type="mrg" distinct="false" delete="false">
      - <sourcetargetmappings>
        - <sourcetargetmapping type="i" targetColumn="Arraykey">
          <sourcemapping>usingsource.st_id</sourcemapping>
          </sourcetargetmapping>

- <sourcetargetmapping type="i" targetColumn="Arrayid">
          <sourcemapping>usingsource.st_id</sourcemapping>
          </sourcetargetmapping>

- <sourcetargetmapping type="i" targetColumn="Arrayserialnumber">
          <sourcemapping>usingsource.st_sn</sourcemapping>
508       </sourcetargetmapping>

- <sourcetargetmapping type="i" targetColumn="Arraytype">
          <sourcemapping>usingsource.st_type</sourcemapping>
          </sourcetargetmapping>

- <sourcetargetmapping type="i" targetColumn="Arraymodel">
          <sourcemapping>usingsource.st_model</sourcemapping>
          </sourcetargetmapping>

- <sourcetargetmapping type="i" targetColumn="Arrayvendor">
          <sourcemapping>usingsource.st_vendor</sourcemapping>
          </sourcetargetmapping>
        ...
510   </sourcetargetmappings>
      <sourcejoin>(srmarray.arrayid=usingsource.st_id)</sourcejoin>
      <usingclause>(select st_id arraykey,st_id,st_sn,st_alias,st_type,st_model,
           st_vendor,st_agenttype,null site_id,ST_POWERONTIME,
           ST_MICROCODE,SY_MICROCODE_DATE,SY_MICROCODE_PATCH,
512        SY_MICROCODE_PATCHDATE,SY_FAMILY, ST_CACHESLOTS,
      ST_CACHE
           from sourceDb.sts_array_list)usingsource</usingclause>
      </etl_load>
    </etl_job>
    ...
  </job_group>                            500
```

Fig. 9

```
522 ── <job_group name="srm_array_metrics_tables_group_populate">
      <job_group_desc>populate srmarray metrics tables</job_group_desc>
      - <etl_job name="populate_srmarraymetrics" enabled="true"
524 ──   defaultTargetConn="targetDb"
         defaultSourceConn="sourceDb"
         defaultSourceObject="sts_array_list" defaultTargetObject="srmarraymetrics">
      <job_desc>populate srmarraymetrics table using ias</job_desc>
        - <etl_load type="ias" distinct="false" delete="true">
          - <sourcetargetmappings>

- <sourcetargetmapping type="i" targetColumn="ArrayRawTotal">
              <sourcemapping>ST_RAW</sourcemapping>
              </sourcetargetmapping>

526 ──      - <sourcetargetmapping type="i" targetColumn="ArrayConfigRaw">
              <sourcemapping>ST_CONFIG_SUM_RAW</sourcemapping>
              </sourcetargetmapping>

- <sourcetargetmapping type="i" targetColumn="ArrayConfigTotal">
              <sourcemapping>ST_CONFIG_SUM</sourcemapping>
              </sourcetargetmapping>
              ...
           </sourcetargetmappings>
528 ──    <deletefilter>srmarraymetrics.datekey >= (SELECT datekey FROM latestetlload)
          </deletefilter> <inserthints>/*+ parallel(SRMArrayMetrics,[gpd]) */
                          </inserthints>
        </etl_load>
      </etl_job>
      ....
    </job_group>
                        520
```

*Fig. 10*

SYSTEM AND METHODS FOR MODELING A REPORT QUERY DATABASE

BACKGROUND

In a modern information processing environment, transactional data is often generated in the course of normal operations. With modern technology providing seemingly ever increasing storage capacity and processing resources, such transactional data has the potential to become large and cumbersome, as additional information and audit trail capability is sought. In a storage area network (SAN), for example, a management application generates transactions corresponding to data storage used, storage available, frequency of access, accessible capacity, and other statistical information. Such statistical information is valuable from a diagnostic and maintenance perspective for various purposes, such as to identify areas of potential backlog, pinpoint performance shortfalls, and for trending analysis to map future demands.

Relational databases have gained popularity for storing such transactional data gathered from an information processing system. More recently, so-called multidimensional databases have provided a mechanism for storing and querying vast amounts of transactional data according to many attributes, or dimensions, such as time, location, product, department, and any combination, permutation, and/or subdivision. While flexible, such multidimensional databases, also known as OnLine Analytical Processing (OLAP) systems, tend to be computation and storage intensive. A modern OLAP system has the potential to generate huge quantities of queryable data, and enables complex queries that require substantial computational resources.

In such OLAP systems, as in relational databases (often the underlying storage mechanism in OLAP systems), data is stored in tables having associations to other tables. Report queries are processed by performing a join operation which traverses the associations between tables. However, the processing required is exponentially proportional to the number of entries in the tables. Accordingly, complex multidimensional queries tend to rapidly consume processing power, particularly when many tables are traversed to process the query. Accordingly, the report queries may create contention with the ongoing data gathering operations for the database that they cover. In a storage area network, where access to storage arrays is paramount, it is highly detrimental for the transactional processing of the management application to compete with or impede access to the storage arrays.

SUMMARY

A large managed information environment, such as a storage area network (SAN), accumulates many transactions resulting from ongoing operation of the system. A database stores the transactions to maintain statistical metrics pertaining to data access. The database maintains information about the manageable entities in the storage area network such as access time, data volume, access rates, queue depth, and other statistics pertaining performance, load and demands on the SAN. These transactions represent the usage and throughput of the system as entries in various database tables. In a storage area network, these transactions are the result of data access requests and associated operations among the manageable entities in the storage area network. These transactions are stored in a large online database operable to provide configuration and management control of the manageable entities in the SAN. A network storage management application also queries this database for diagnostic and preventative matters such as providing feedback, monitoring past throughput, and identifying resource utilization, bottlenecks, and performance shortfalls.

In an effort to relieve the demand on the online database from the query requests used to generate operational reports, the online data may be offloaded to a queryable format adapted for querying and reporting, rather than realtime updating as in the online database. The offloaded data may be retrieved in a sequential manner that minimizes contention for the online database. Such a sequential offloading, however, may result in a loss of indexing and random accessibility to the data stored thereby. Accordingly, retrieval of the offloaded report query data involves sequential accessing of the offloaded data. For example, the offloaded data may take the form of an XML file or other markup representation. Unfortunately, the above described data gathering approach suffers from several shortcomings. Such scripted representations, while retaining the normalized field structure due to hierarchical nesting, tend to result in cumbersome and time-consuming parsing operations in order to traverse and extract the data.

Configurations of the invention are based, in part, on the observation that processing conventional offloaded data tends to suffer from the loss of indices and other normalization present in the relational database form (i.e. database tables) Further, the hierarchical scripted form of the offloaded data fails to take advantage of associations between different tables employed in the database form of the data.

According, configurations of the invention as disclosed herein substantially overcome the above described shortcomings by providing a query report database according to a query model which provides an optimal organization for report queries. Data gathered for report queries tends to employ data organized according to external demarcations such as time and geographic region. The data reported tends to refer to facts, such as bytes transferred or queue depth. For example, a fact is usually a numerical attribute like count or capacity, such as a storage device count, file system total, file system used bytes, etc. A dimension is usually a textual descriptor like name, type, vendor, etc. For a fact, the data may typically be changed over time. For dimension, it is usually static or slowly changed. Accordingly, the query model employs a single fact table having the fact data, and maintains a plurality of associations to dimension tables storing the external demarcation data. The external demarcations define the dimensions, since each is independent and operable to be queried separately (i.e. daily or weekly requests for a particular site or for all sites).

In a large managed information environment, the online query database, or managed object database, can become unwieldingly large, particularly for complex queries spanning many tables and associations. Additionally, such extended queries further increase resource contention with the SAN processes currently writing new transactions to the online database.

In a conventional storage area network (SAN), therefore, the operational data pertaining to throughput and performance metrics is often offloaded, or mirrored, in a query database to avoid burdening the online data access mechanism with query access attempts for report generation. The query database serves different purposes than the online gathering database (e.g. the managed object database), and therefore employs a different structure than the online counterpart. For example, the query database may be employed for queries about access throughput days or weeks following the actual access attempt. Accordingly, such statistical and longer term information is burdensome to maintain in the online database which is adapted for real time or near real time transactions.

Conventional reporting databases for gathering statistical data include a multiplicity of tables having associations to other tables, and is typically based on an entity-relation arrangement that lends itself well to relational database tables. Processing report data therefore includes traversing the associations in the database to identify related data records in a process known as a join. Such joins tend to be computationally expensive, particularly when the number of tables and/or records is large. Accordingly, conventional data reporting mechanisms tend to be computationally intensive, cumbersome, and may impede the data gathering operations of newly generated transactions because of concurrent access contention to the online database.

Accordingly, it is beneficial to structure the query database for query data retrieval, in contrast to realtime access transaction storage as in the online database. In the query database, efficiency suggests reduced volume, coupled with a queryable arrangement (schema) that avoids exponential response time growth with database size. However, expected queries may take many forms, and interrogate many available data attributes. Therefore, configurations herein transform the online database into a so-called "star join schema," or table structure, that centralizes database "facts" in a central table and forms associations to database "dimensions" upon which a query is likely to be based. In general, the facts refer to items which tend to change regularly over time, such as sales volumes and unit shipped. Conversely, the dimensions include more static values such as time (e.g. days, weeks, and quarters) and geographic regions, such as states and countries. The resulting query model schema includes relatively small dimensions tables associated with (i.e. having a schema association to) a relatively larger fact table. Since the dimension tables are small, queries based on multiple dimensions nonetheless are computable in a manageable timeframe (e.g. the computability O(n) operations do not "blow up" into requests which take substantial time to aggregate all dimensions).

The resulting query database model employs strong indexing on the attributes of the fact table, coupled with relatively few records in the dimension tables. Further, the fact table is periodically consolidated, or "rolled up," to reduce the granularity of data at certain aging thresholds (i.e. older than a week or month, for example). In this manner, the query model consolidates the multiplicity of tables from the online database, each having associations to other tables and requiring computationally intensive joins to process, into a central fact table and set of dimension tables, optimizing the data for query and reporting purposes.

In further detail, the method of modeling a storage area network database for optimized report queries as discussed herein includes identifying a plurality of tables in an object model of an online database, and enumerating tables for transformation to the report query database. The method extracts the enumerated tables from the database and filters, for each of the tables, unqueried fields to identify a transformation set of tables and attributes within the tables, in which the transformation set is indicative of queryable values employed by the report database. A set of generated transformations transforms, via a set of views, the attributes of the transformation set, and a loader loads the transformed attributes into the corresponding tables in a report database. The enumerated tables each have attributes (i.e. fields of a relational DB table), and for each attribute, the method classifies the attribute as a dimension or a fact. A discriminator assigns, if the attribute is a fact, the attribute to a central metrics table, and assigns, if the attribute corresponds to a dimension, the attribute to a dimension table having an association to the central metrics table. Loading the attributes further includes loading the tables into dimensional tables and a fact table, as appropriate, in which the dimension tables are determined from query logic indicative of fields adapted to receive a query. In the exemplary configuration herein, the central metrics table is a common storage array metrics table indicative of facts concerning manageable entries in a storage area network.

Transforming the table and attributes further includes defining transformation logic indicative of a set of views and tables, and transforming, via the transformation logic, attributes in the online database to corresponding attributes in the query DB model, such that the corresponding attributes include at least one of facts and dimensions and are assigned to corresponding fact or dimension tables. In the exemplary configuration, the views are SQL views between a plurality of tables. The views are indicative of join operations between the enumerated tables and operative to logically link the entries in the tables.

Enumerating the tables further involves defining an offline set of tables operable to receive the identified plurality of tables, in which the offline set is indicative of queryable values, and discriminating, from the offline set, fact attributes and dimension attributes. The transformation logic then generates the query model tables based on the discrimination of the attributes and dimensions.

Historical data is maintained by rolling up the data on a periodic basis to consolidate counts and reduce the size of the data in the storage array metrics table. Rolling up the data further includes aggregating the data in the storage array metrics table according to at least one of daily, weekly, and monthly reporting period, or other appropriate timeframe. The method computes a different resolution for the aggregated data indicative of the aggregating reporting period, for example aggregating daily counts to weekly counts, and storing the aggregated data as a historical data table. Reports may then be performed on the aggregated historical data. In particular configurations, the report data is employed by a query engine responsive to a user query and operable to access the generated tables responsive to a received user query.

In a particular configuration, extracting the attributes further includes extracting, in a nested scripting language, a scripted representation of the offline set of tables, and parsing the scripted representations responsive to a query, such that the scripted representations have a hierarchical structure operable to designate delimited fields and entries (i.e. XML).

Alternate configurations of the invention include a multi-programming or multiprocessing computerized device such as a workstation, handheld or laptop computer, cellphones or PDA device, or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 9 and 10 are an exemplary mapping and loading instruction sequence for a database entity in FIG. 3.

DETAILED DESCRIPTION

In a storage area network, a Decision Support System (DSS) offloads and transforms data from the online statistical gathering database to a report query database adapted for offline report generation. A DSS coalescer generates and populates a query database structured for query data retrieval, in contrast to realtime access transaction storage as in the online database. Exemplary configurations transform the online database into a star join schema or table structure that centralizes database "facts" in a central table and forms associations to database "dimensions" upon which a query is likely to be based. The facts refer to items which tend to change regularly over time, such as sales volumes and unit shipped. Conversely, the dimensions include more static values such as time (e.g. days, weeks, and quarters) and geographic regions, such as states and countries. The resulting query model (schema) includes relatively small dimension tables associated with (i.e. having a schema association to) a relatively larger fact table. Since the dimension tables are small, queries based on multiple dimensions, nonetheless are computable in a manageable timeframe (e.g. the computability O(n) operations do not "blow up" into requests which take substantial time to aggregate all dimensions). Since the dimension tables are maintained with a relatively small number of entries, large M*N joins are avoided even when multiple dimension tables are joined.

The resulting query database model employs strong indexing on the attributes of the fact table, coupled with relatively few records in the dimension tables. Further, the fact table is periodically consolidated, or "rolled up," to reduce the granularity of data at certain aging thresholds (i.e. older than a week or month, for example). In this manner, the query model consolidates the conventional multiplicity of tables from the online database, each having associations to other tables and requiring computationally intensive conventional joins to process, into a central tact table and set of dimension tables, optimizing the data for query and reporting purposes.

Figure 1:
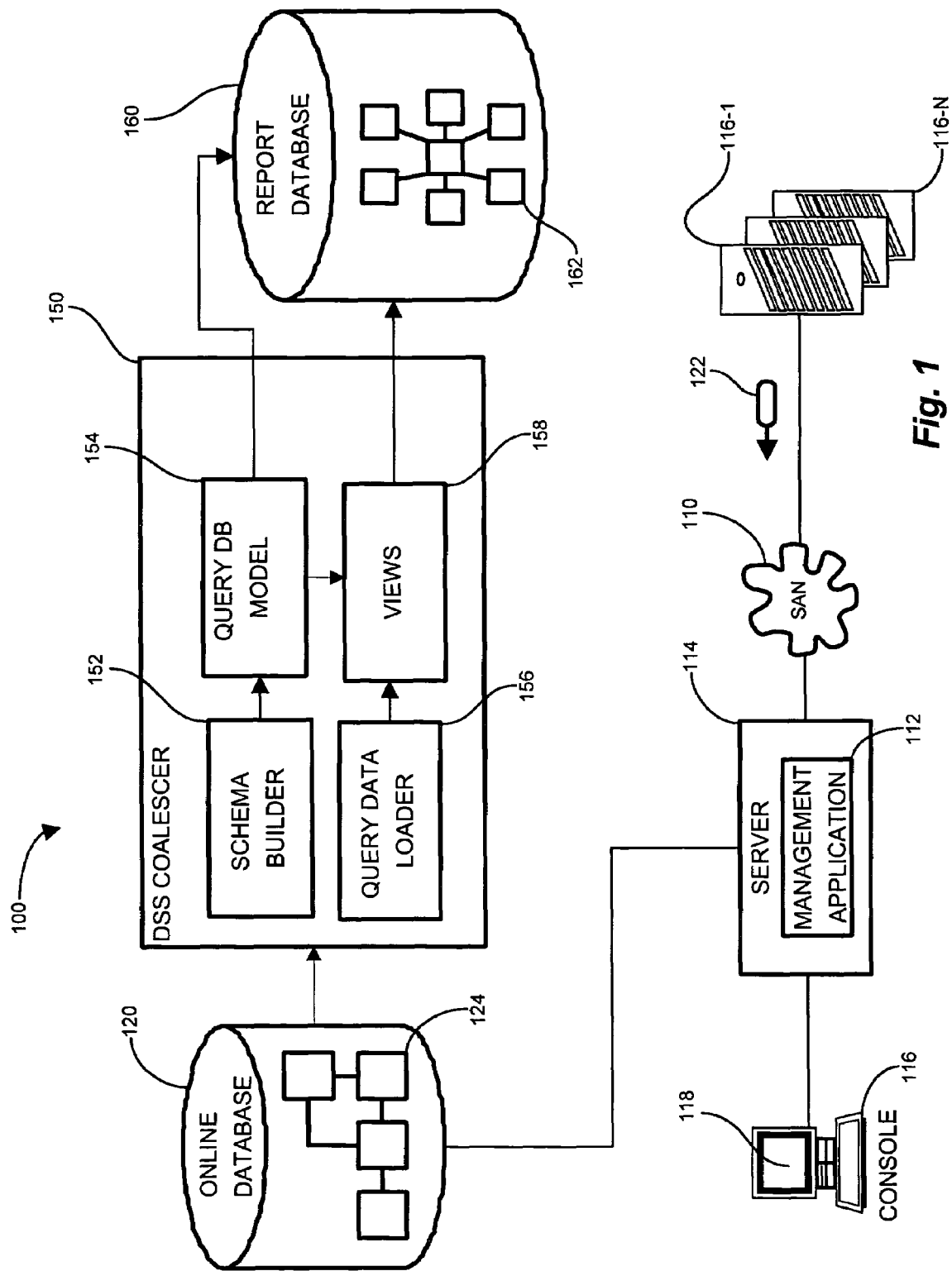
FIG. 1 is a context diagram of an exemplary managed information environment suitable for use with configurations discussed herein.

FIG. 1 is a context diagram of an exemplary managed information environment including a storage area network (SAN) 110 suitable for use with configurations discussed herein. In an exemplary configuration, the storage area network (SAN) interconnects a plurality of manageable entities 116-1 . . . 116-N (116 generally) such as storage arrays, connectivity devices, and hosts. The manageable entities 116 collectively provide mass storage and retrieval services to a user community (not specifically shown). The manageable entities 116 are responsive to a management application 112 running on a server 114 operable to manage and monitor the manageable entities 116 interconnected via the SAN 110. A console 116 includes a graphical user interface (GUI) 118 for interaction with a user or operator for executing the management application 112, operable for use with a query engine discussed below.

In the course of normal operations, the management application 112 gathers transactional data 122 concerning SAN 110 operation and stores the transactional data in an online database 120, such as a SAN manageable entity database. The transactional data 122, as indicated above, includes various performance metrics about the manageable entities 116, such as storage space used, storage space available, configured space, raw space, data throughput, and other data useful for diagnosing and maintaining the SAN 110 in an optimal state. Such transactional data 122, indicative of the operation of the SAN, is useful for making operation and maintenance (O&M) decisions about the SAN, such as configuration changes to avoid bottlenecks and equipment upgrades to satisfy usage demands. In accordance with principles of the invention, a decision support system (DSS) coalescer 150 offloads some of the transactional data 122 to avoid impeding and overburdening the online database as the data grows. Such offloading allows the online database to remain uncluttered and unencumbered with older transactions so as to streamline response for current transactions 122. The DSS coalescer 150, as discussed in further detail below, coalesces the transaction data 122 into a report database more adapted for querying and reporting, rather than realtime response as in the online database 120

The DSS coalescer 150 includes a schema builder 152, a query DB model 154, a query data loader 156, and a set of database views 158. The schema builder 152 identifies a database table structure 124 in the online database, and defines the query database model 154 having an alternate, transformed table set 162 for populating the report database 160 (offline query database). As indicated above, the query table set 162 has a star structure highly adaptable to query processing, in contrast to the interconnected table structure 124 of the online database (which is optimized for fast response). The schema builder 152 is operable to read the schema definition (table structure) 124 of the online database 120 and generate the query DB model 154 having tables in a star structure 162 for report queries. In operation, the query DB model 154 is employed to generate database views 158 that define transformations from the online database 120 to the query database 160. The database views 158 map attributes of the online DB 120 tables to corresponding attributes in the star table structure 162 of the report DB 160. Following development of the query DB model 154 and the corresponding tables 162, the query data loader 156 employs the views 158 for transforming offloaded data from the online database 120 to the report database 160.

Figure 2:
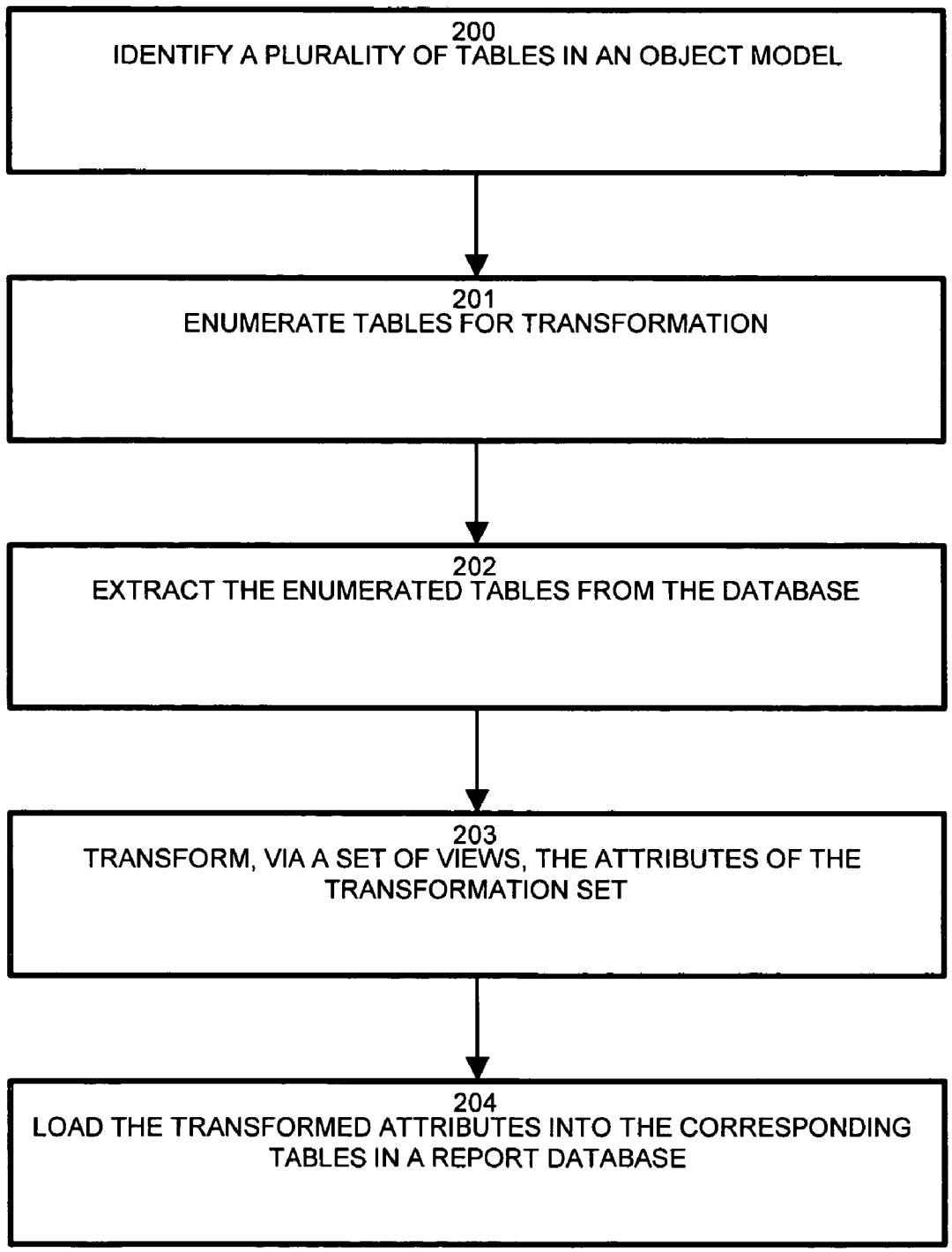
FIG. 2 is a flowchart of query database modeling in the system of FIG. 1.

FIG. 2 is a flowchart of query database modeling in the system of FIG. 1. Referring to FIGS. 1 and 2, the method of modeling a storage area network for optimized report queries as defined herein includes, at step 200, identifying a plurality of tables in an object model, or schema definition 124, of the online database 120. The online database is optimized for recording data concerning user data access requests via the SAN 110, and typically accumulates large amounts of statistical data, but with an emphasis on avoiding burdening the data access requests with the accumulation of recorded data. In other words, the online database 120 is tuned for recording data, while the report database 160 is structured for retrieval. At step 201, the schema builder 152 enumerates the tables for transformation, including the fields needed for the report database 160. The schema builder 152 extracts the enumerated tables 124 from the database 120 to build a query DB model 154 representing the data in a form more suited for queries, rather than fast accumulation, as disclosed at step 202. The schema builder 152 also generates a set of views 158, defining the transformation from the online database 120 to the report database 160 for each of the transformed fields. The query data loader 156 then, at step 203, transforms, via the set of views 158, the attributes of the transformation set, and loads the transformed attributes into the corresponding tables 162 in the report database 160, as depicted at step 204. The views 158, therefore, identify a mapping of the online database fields 124 to corresponding fields in the report database 160 according to the query DB model 154. The star schema arrangement of tables 162 in the report database 160 stores the data in an optimized form according to the query DB model 154.

Figure 3:
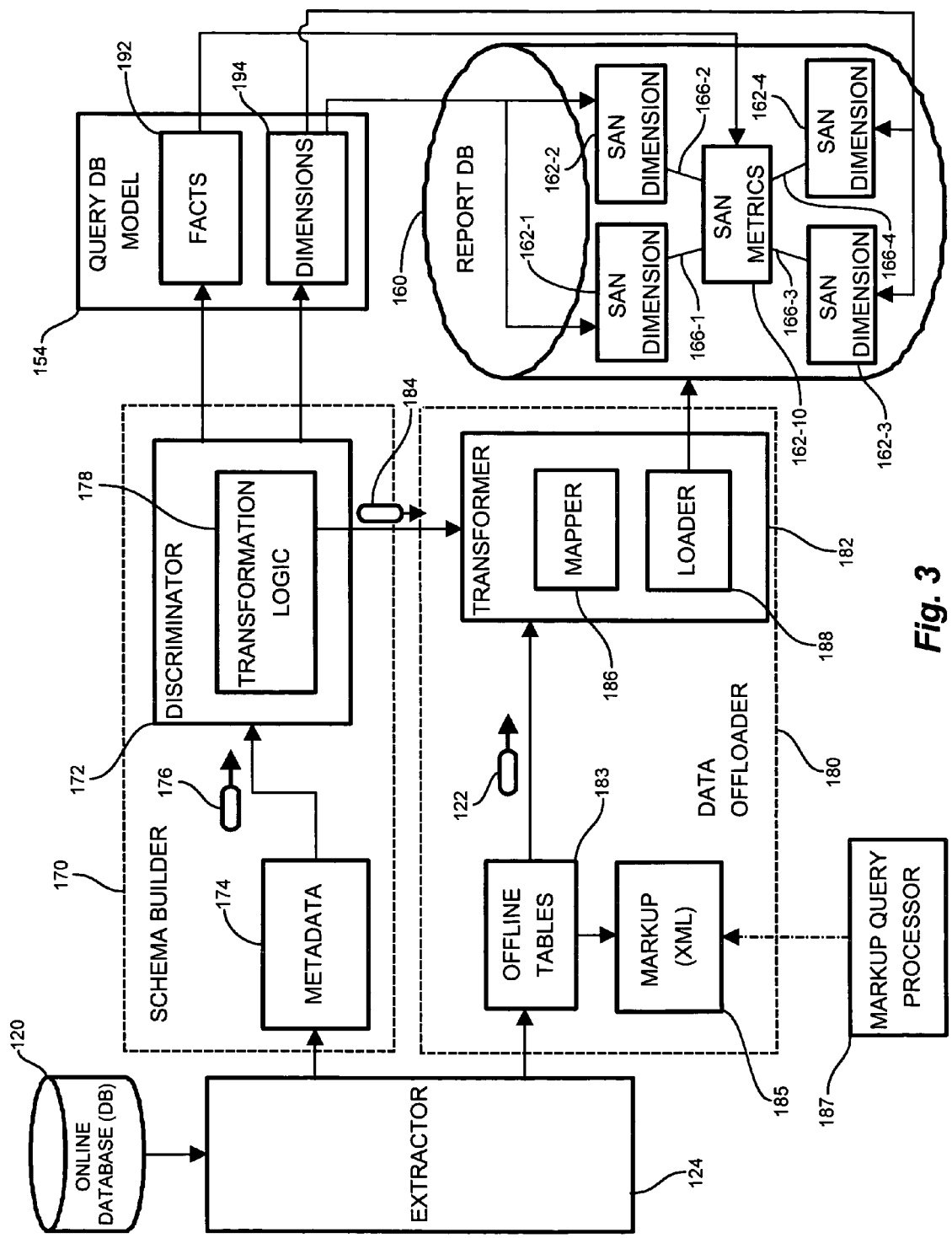
FIG. 3 is a block diagram for modeling a Storage Array Network management database in the environment of FIG. 1.
Figure 4:
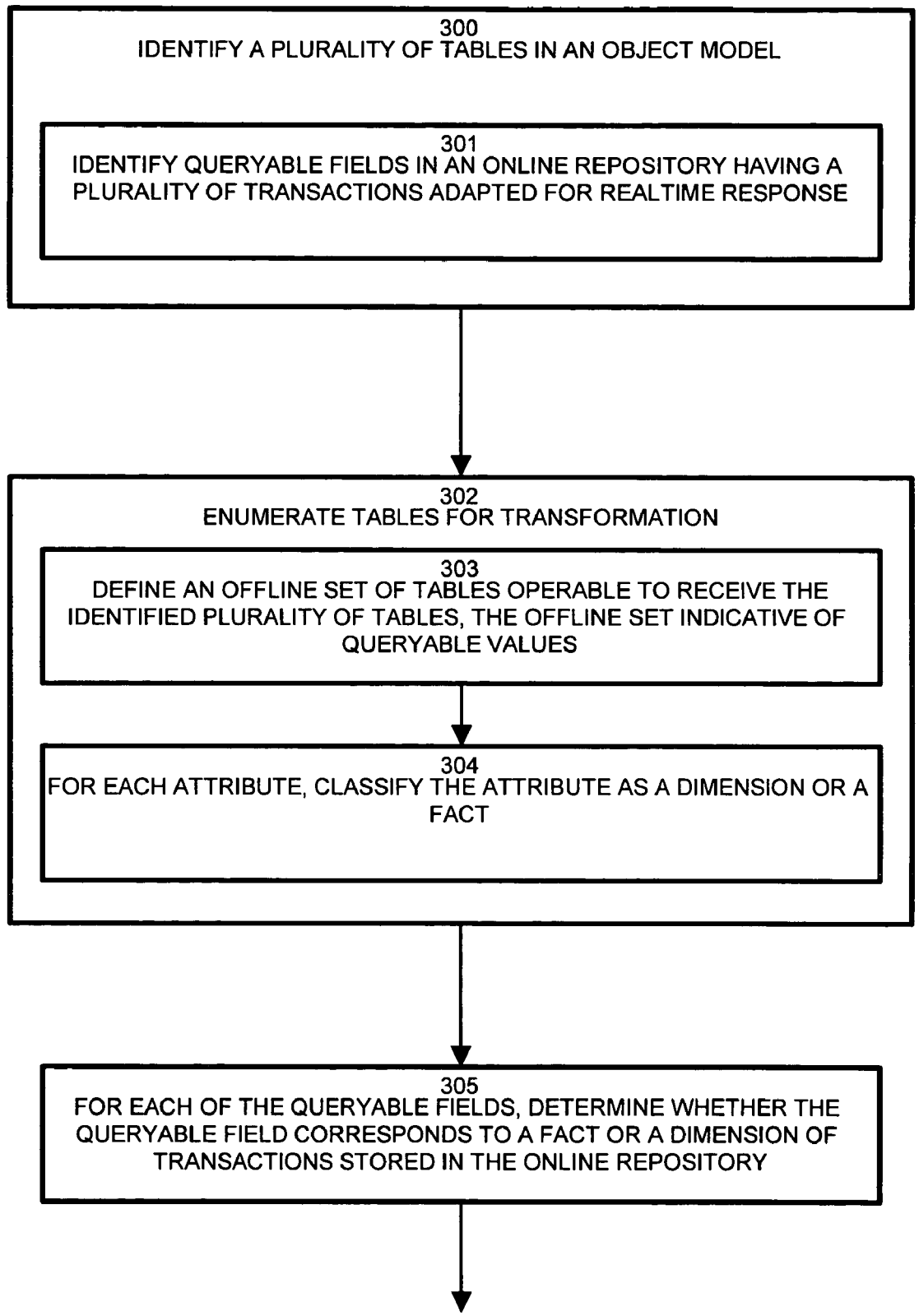
FIGS. 4-8 are a flowchart of SAN manageable entity modeling for the database in FIG. 3.
Figure 5:
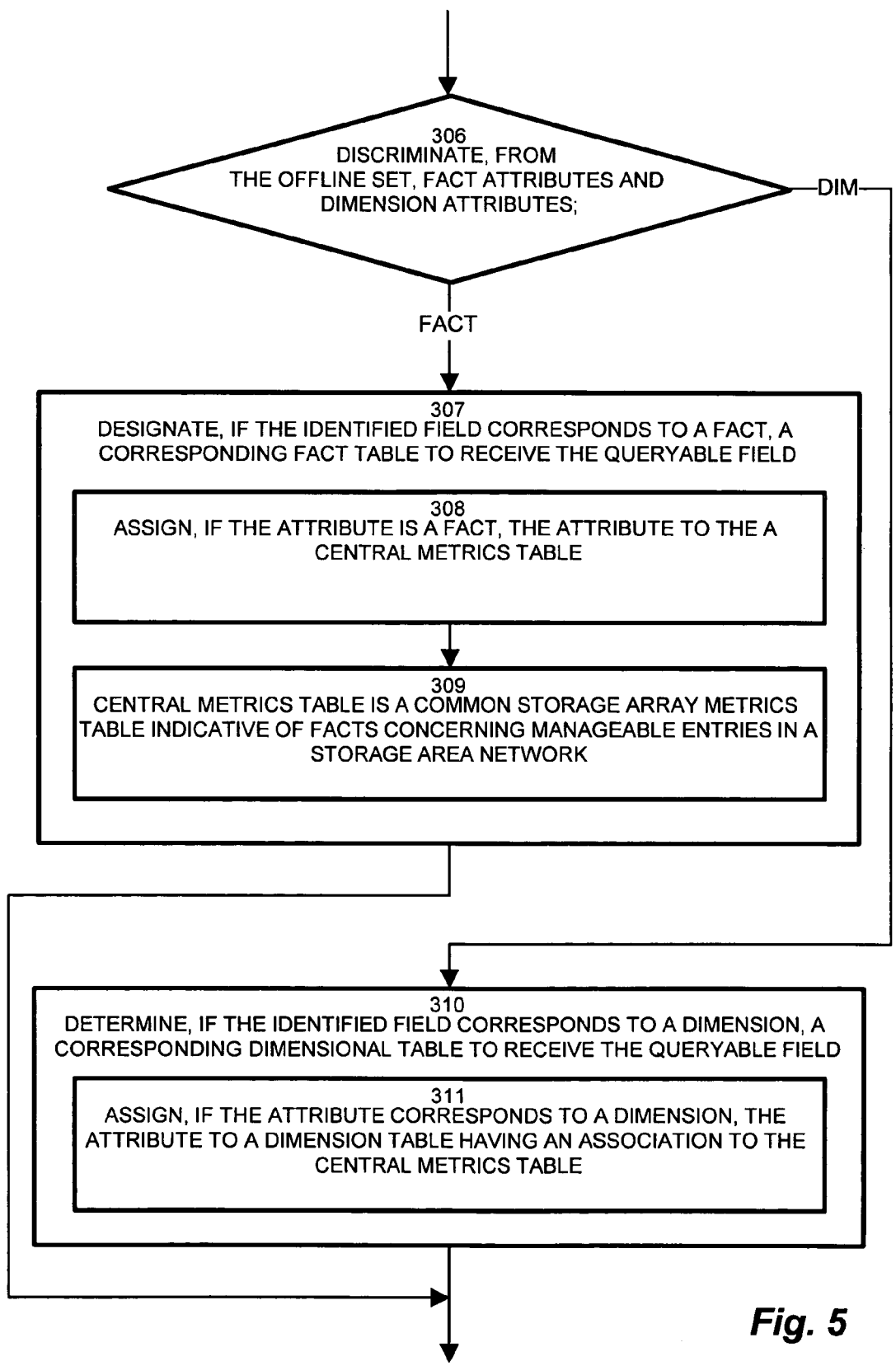
Figure 6:
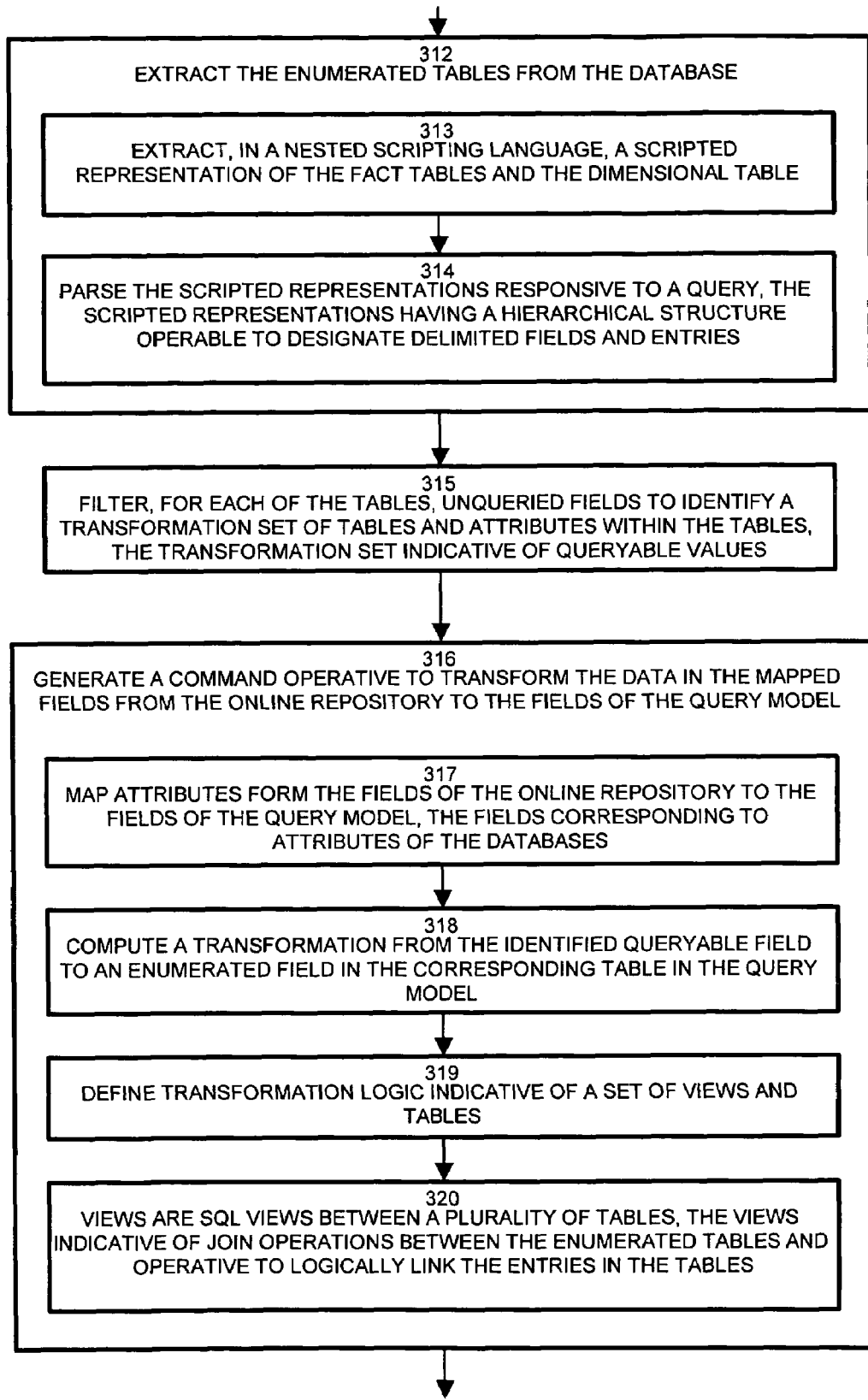
Figure 7:
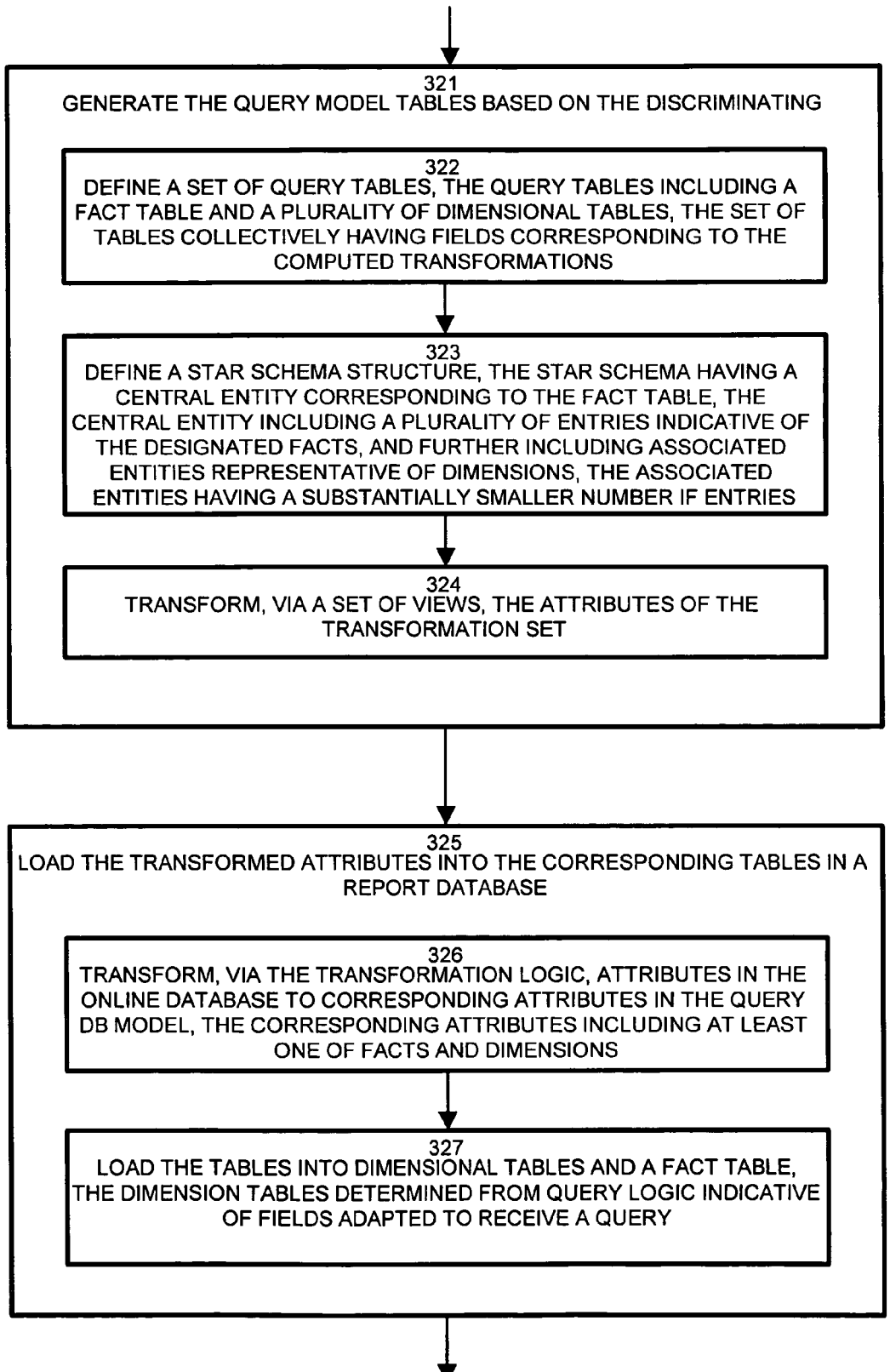
Figure 8:
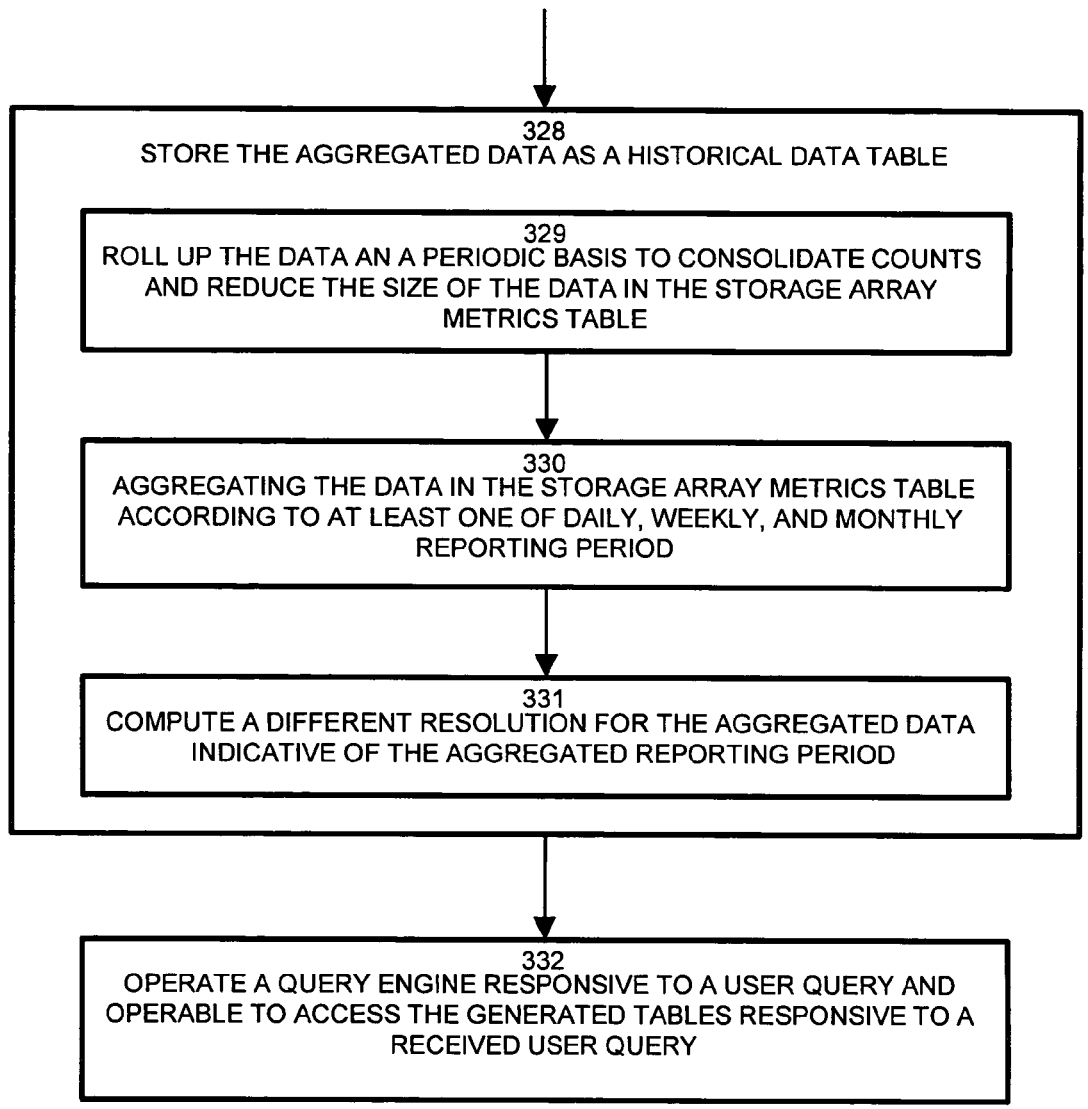

FIG. 3 is a block diagram for modeling a Storage Array Network management database 120 in the environment of FIG. 1. Referring to FIGS. 1-3, the DSS coalescer 150 includes a discriminator 172 and a transformer 182. The discriminator 172 is employed for translating and generating the schema for the query DB model 154, as shown by the dotted line 170, and the transformer 182 then transforms the data transactions 122, as shown by the dotted line 180. Therefore, the schema builder 170 generates the table structure 162 for the report database 160, and the data offloader 180 transforms the data and populates the table structure 162 with data accrued from the online transactions 122.

In operation, an extractor 124 is operable to extract table data (i.e. schemas) from the online database 120 as metadata 174 (such as XML, for example). The discriminator 172 retrieves table/schema information from the metadata 174 to transform fields from the online database 120. For each field (i.e. attribute) the discriminator employs transformation logic 178 to determine if the attribute is a fact or a dimension in the query DB model 154. For the query DB model tables, a fact is usually a numerical attribute like count or capacity, for example storage device count, file system total, file system used, etc. In contrast, a dimension is usually a textual descriptor like name, type, vendor, etc. A distinguishing criteria is that for a fact, the data typically changes over time. For dimension, it is usually static or infrequently changed. The transformation logic 178 determines whether a particular field is a fact or dimension, and then determines the appropriate table in the query DB model 154.

The transformation logic 178 therefore, determines the facts 192 and dimensions 194 in the query DB model 154. The transformation logic 178 also defines the views 184 for transforming the online DB fields 124 to the report DB fields 162. The transformer 182 receives the views, and employs the views 158 in a mapper 186 for mapping the online transactions 122 to the corresponding facts 192 and dimensions 194 in the report DB 160.

The report DB 160 includes tables 162-1.162-N based on the facts 192 and dimensions 194 from the query DB model 154. The tables 162 generally follow a star arrangement, meaning that there is a central fact table 162-10 having associations 166-1 . . . 166-4 (166 generally) to a plurality of dimension tables 162-1 . . . 162-4. Once the transformation logic 178 defines the query DB model 154 and the report DB 160 creates the corresponding tables 162, the report DB 160 is operable to receive offloaded transactions 122 from the online DB 120. The extractor 124, according to a periodic schedule and criteria, stores transactions 122 into the report database 160 via the transformer 182. Alternatively, in particular configurations, transactions may be buffered in offline tables 183. The offline tables 183 are such that they may be extracted (dumped) in a text or scripted format, such as an XML file 185, operable for querying and processing by a markup processor 187 such as a parser. In the exemplary configuration, however, the transformer receives the offline tables 183, maps them to tables 162 via the mapper 186, and transforms the data to the mapped tables 162 via the loader 188, as will now be discussed in further detail.

In one example, a storage array metrics table (SAN metrics table 162-10) is an example of a fact table, having associations 166-1 . . . 166-4 (166 generally) to the dimension tables 162-1 . . . 162-4. There may be several independent star structures 162, however, having related dimensions (through multiple sets of associations 166) between the tables 162. Accordingly, the exemplary configuration employs a host metric fact table as the SAN metrics 162-10 table with associated host, file system and database dimensions. In the exemplary SAN context, a host may also be related to a storage array through an intermediate entity (table 162) between the host and array entities. Such an intermediate entity operates as a so-called factless fact table for defining the relation between large entities. The factless fact table, therefore, defines the related fields through a relatively small number of records (entries), avoiding large N*M joins.

It should be noted that the exemplary query DB model 154 does not generate functionally dissimilar table types. Both the "fact" tables and the "dimension" tables are database tables which are operable in a join with other tables. The query DB model 154 is structured such that the report data is gatherable from a single fact table and multiple dimensional tables. While joins on multiple fact tables 162-10 may be possible with particular database query engines, such operation avoids employing the star schema arrangement 162 in an optimal manner.

FIGS. 4-8 are a flowchart of SAN manageable entity modeling for the database in FIG. 3. Referring to FIGS. 3-8, at step 300, the schema builder 170 begins generating the query database model 154 from the online repository (database) 120 by identifying a plurality of tables 124 in the object model of the online database 120. Employing the extractor 124, metadata 174 identifies queryable fields in the online repository 120 having a plurality of transactions adapted for realtime response, as shown at step 301. The discriminator 172 enumerates tables 176 for transformation, as shown at step 302. Enumerating the tables further includes defining an offline set of tables in the query DB model 154 operable to receive the identified plurality of tables, in which the offline set is indicative of queryable values, as depicted at step 303. The enumerated tables each have attributes operable to store the queryable values, as shown at step 304.

To generate the query DB model 154, for each attribute, the transformation logic 178 classifies the attribute as a dimension 194 or a fact 192. Accordingly, at step 305, for each of the queryable fields, the transformation logic 178 determines whether the queryable field corresponds to a fact or a dimension of transactions stored in the online repository 120. At step 306, the discriminator 172 discriminates, from the offline set, fact attributes and dimension attributes. Based on the check at 306, at step 307, the discriminator 172 designates, if the identified field corresponds to a fact, the corresponding fact table 192 to receive the queryable field. In the exemplary configuration, the discriminator 172 assigns, if the attribute is a fact, the attribute to the central metrics table 162-101, as depicted at step 308. The central metrics table is a common storage array metrics table indicative of facts concerning manageable entries in the storage area network 110, as depicted at step 309. The facts 192 of the query DB model 190 may represent a plurality of different queryable fact entities, each defining a central "metrics" table 162-10 in a star arrangement 162.

Returning to the check at step 306, the transformation logic determines, if the identified field corresponds to a dimension, a corresponding dimensional table 162 to receive the queryable field, as shown at step 310. The discriminator 172 then assigns, if the attribute corresponds to a dimension, the attribute to a dimension table 162 having an association to the central metrics table 162-10, as depicted at step 311. As indicated above, there are typically multiple dimension table 162-1 . . . 162-4 clustered (i.e. having an association 166 to) a central metrics, or fact table, 162-10, as defined by the facts 192 and attributes 194 of the query DB model 154.

Following table 162 generation in the report DB 160 based on the query DB model 190, the transformation of the actual data is performable at regular periodic intervals, such as daily. At step 312, the extractor 124 extracts the enumerated tables from the database 120 into offline tables 183 containing the query data. In one configuration, extracting further comprises extracting, in a nested scripting language, a scripted representation of the fact tables and the dimensional table, as shown at step 313, and parsing the scripted representations responsive to a query, the scripted representations having a hierarchical structure operable to designate delimited fields and entries, as depicted at step 314. Such an alternate configuration is applicable to an XML query interface via a markup query processor 187.

In the exemplary configuration, the transformer 182 transforms the offline tables 183 into the report DB 160 in a manner consistent with the query DB model 154. Therefore, generating the report database 160 includes three phases. The first defines the query model 154 and defines the fact and dimension table schema as shown in steps 307 and 310, respectively. The second phase, described further below in step 321, defines the tables 162 in the report database 160 based on the fact 192 and dimensions 194 from the generated query DB model 190. A third phase populates the report database 160 with the proper data from the online database and is expected to be repeated periodically so as to track the online database in a manner usable for reports.

Since the discriminator 172 selects a subset of online database 120 fields for transformation, the extractor 124 filters, for each of the tables, unqueried fields to identify a transformation set of tables and attributes within the tables, such that the transformation set is indicative of queryable values stored in the offline tables, as depicted at step 315. Concurrent with employing the transformation logic 178 to define the facts 192 and dimensions 194, the transformation logic 178 generates commands 184 operative to transform the data in the mapped fields from the online repository 120 (via the offline tables 183) to the fields of the query model 154, as depicted at step 316. The commands 184 map attributes form the fields of the online repository 120 to the fields of the query model 154, in which the fields correspond to attributes of the databases 120 and 160, as shown at step 317. The transformation logic 178, therefore, computes a transformation from the identified queryable field to an enumerated field in the corresponding table in the query model 154, and delivers the transformation to the transformer 182 as commands 184 for executing the actual transformation of the data values. In the exemplary configuration, the transformation logic 178 is indicative of a set of views and tables, as depicted at step 319. The views are SQL views between the plurality of tables, such that the views are indicative of join operations between the enumerated tables and operative to logically link the entries in the tables, as shown at step 320.

Following completion of the query model DB 154, the query model 154 is employed to generating the query model tables 162 in the report DB 160 based on the discriminating, as shown at step 321. The model 190 defines a set of query tables 162, in which the query tables include a fact table 162-10 and a plurality of dimensional tables 162-1 . . . 162-4. Based on the model 154, a DBA or operator defines a set of tables including the determined dimensional tables 166-1 . . . 166-4 and the designated fact table 166-10, such that the set of tables collectively has fields corresponding to the computed transformations (i.e. views 184) resulting from the query DB model 154 transformation, as depicted at step 322. Table definition includes defining a star schema structure 162, such that the star schema has a central entity 162-10 corresponding to the fact table, in which the central entity includes a plurality of entries indicative of the designated facts, and further includes associated entities 162-1 . . . 162-4 representative of the dimensions, in which the associated entities have a substantially smaller number if entries, as depicted at step 323. Multiple fact tables may be included in the query tables, each arranged in a star schema format with dimensions corresponding to expected queries (i.e. reports). The resulting commands are further operable for transforming, via the set of views 184, the attributes from the offline tables 183 to the transformation set of the tables 192, 194, as depicted at step 324.

The report database 160 invokes the transformer 182 to load the transformed attributes into the corresponding tables in the report database 160 by performing, or executing the commands 184 and views, as shown at step 325. The transformer 182 receives the data from the offline tables 183 populated by the extractor 124, and the mapper 186 employs the views 158 to transform the attributes from the online database 120 to corresponding attributes in the query DB model 160, in which the corresponding attributes include at least one of facts and dimensions, as depicted at step 326. The loader 188 then loads the tables into dimensional tables 162-1 . . . 162-4 and the fact table 162-10, in which the dimension tables have been previously determined from the transformation (query) logic 178 indicative of fields adapted to receive a query, as shown at step 327.

As indicated above, the report DB 160 is periodically updated to maintain a sliding window of recent SAN activity for report queries, and for use as historical data according to available storage and longevity requirements. Accordingly, the report DB stores the aggregated data as a historical data table, as depicted at step 328. Maintaining historical data further includes rolling up the data an a periodic basis to consolidate counts and reduce the size of the data in the storage array metrics table 162-10, as shown at step 329. The rolling up operation aggregates the data in the storage array metrics table according to at least one of daily, weekly, and monthly reporting period, as depicted at step 330, thus computing a different resolution for the aggregated data indicative of the aggregated reporting period, as shown at step 331. The aggregation, or rolling up, typically stores data counts for a longer (e.g. more granular) time period, such as hourly to daily, or daily to monthly, to reduce granularity and corresponding storage while maintaining accuracy of the data.

The report database is typically employed for generating SAN activity reports, such as statistical data of SAN activity (i.e. storage used, storage available, number of requests, data volume transferred, etc.). Such activity typically includes an operator or DBA operating a query engine responsive to a user query and operable to access the generated tables responsive to a received user query, as depicted at step 332. Such a query engine is disclosed in further detail in copending U.S. patent application Ser. No. 11/233,687, filed Oct. 11, 2005, entitled "SYSTEM AND METHODS FOR QUERYING A REPORT DATABASE", incorporated herein by reference.

FIGS. 9 and 10 are portions of an exemplary transformation of a database entity in FIG. 3. The exemplary transformation 184 is in an XML script form, and illustrates the mapping and loading operations generated by the transformation logic 178 for performance by the mapper 186 and loader 188. Referring to FIGS. 3, 9 and 10, FIG. 9 shows a code fragment of transformation instructions 184 generated by the transformation logic 178 and performable by the mapper 186 and loader 188 for populating the generated tables 162 in the report DB. In FIG. 9, the exemplary fragment 500 is an XML script having SQL statements for transferring fields from the online database 120 to the report database 160 for a transformation of dimension attributes. The transformer 182 performs many sets of instructions, shown as job groups 502, each including one or more jobs 504. The jobs include load sequences 506, which include a set of mappings 508 for transforming fields from the source (online) database 120 to the fields of the report database 160. A join 510 defines the associations between the tables 162 by specifying the key fields upon which to join. The view 158 that specifies the extracted fields is defined by a selection enumerating specific fields, and includes the fields from the mapping 508.

FIG. 10 illustrates a similar fragment 520 applicable to a fact entity of the report database 162. A job 522 indicates that the metrics table is to be populated. A source statement 524 specifies the online database 120 table including the attributes to be transformed as facts. A set of mappings 526 define the field to field mappings and transformations, and a filter 528 pulls a subset of online fields based on the appropriate date. The exemplary transformations illustrated may take other forms and include other statements, operable to be performed by the mapper and loader for transforming attributes (fields) from tables of the online database 120 to the fact and dimensional tables 162 of the report database 160.

Those skilled in the art should readily appreciate that the programs and methods for modeling a report database in a storage area network as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media. The operations and methods may be implemented in a software executable object or as a set of instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for modeling a report database has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of modeling a storage area network online database for report queries comprising:
   identifying a plurality of tables in an object model;
   enumerating tables for transformation, the tables having attributes operable to store values;
   selecting a subset of fields from the storage area network online database corresponding to multiple fact tables expected to be queried in a report database, wherein the expected queries comprise SAN activity reports;
   extracting the enumerated tables from the online database;
   filtering, for each of the tables, unqueried fields to identify a transformation set of tables, the transformation set indicative of queryable values responsive to user queries;
   transforming, via a set of views and tables, the queryable values of the transformation set;
   for each attribute, classifying the attribute as a dimension or a fact
      assigning, if the attribute is a fact, the attribute to a central metrics table; and
      assigning, if the attribute corresponds to a dimension, the attribute to a dimension table having an association to the central metrics table; and
   loading the transformed values into the corresponding tables in a report database, the report database strongly indexed on the attributes of the fact table, and having fewer records in the dimension tables than corresponding values in the online database.

2. The method of claim 1 wherein loading further comprises loading the corresponding tables into dimensional tables and a fact table, the dimension tables determined from query logic indicative of fields adapted to receive a query.

3. The method of claim 2 wherein the central metrics table is a common storage array metrics table indicative of facts concerning manageable entries in a storage area network, and wherein the facts comprise a numerical attribute including at least one of:
   a storage device count;
   a file system total; and
   a file system used byte count.

4. The method of claim 3 wherein transforming further comprises
   defining transformation logic indicative of a set of views and tables;
   transforming, via the transformation logic, attributes in the online database to corresponding attributes in a query DB model, the corresponding attributes including at least one of facts and dimensions.

5. The method of claim 4 wherein the views are SQL views between a plurality of tables, the views indicative of join operations between the enumerated tables and operative to logically link the entries in the tables.

6. The method of claim 1 wherein enumerating the tables further comprises:
defining an offline set of tables operable to receive the identified plurality of tables, the offline set indicative of queryable values; and
discriminating, from the offline set, fact attributes and dimension attributes; and
generating the query model tables based on the discriminating.

7. The method of claim 6 wherein extracting further comprises:
extracting, in a nested scripting language, a scripted representation of the offline set of tables; and
parsing the scripted representations responsive to a query, the scripted representations having a hierarchical structure operable to designate delimited fields and entries.

8. The method of claim 5 further comprising rolling up the data on a periodic basis to consolidate counts and reduce the size of the data in the storage array metrics table.

9. The method of claim 8 wherein rolling up further comprises
aggregating the data in the storage array metrics table according to at least one of daily, weekly, and monthly reporting period;
computing a different resolution for the aggregated data indicative of the aggregated reporting period; and
storing the aggregated data as a historical data table.

10. A method of generating a query database model from an online SAN repository comprising:
identifying queryable fields in the online repository having a plurality of transactions adapted for realtime response;
selecting a subset of the queryable fields from the online repository corresponding to multiple fact tables expected to be queried in a report database, wherein the expected queries comprise SAN activity reports;
for each of the queryable fields, identifying whether the queryable field corresponds to a fact or a dimension of transactions stored in the online repository;
for each identified field, classifying the identified field as a dimension or a fact;
determining, if the identified field corresponds to a dimension, a corresponding dimensional table to receive the queryable field;
designating, if the identified field corresponds to a fact, a corresponding fact table to receive the queryable field;
computing a transformation from the identified queryable field to an enumerated field in the corresponding table in the query model;
defining a set of tables including the determined dimensional tables and the designated fact table, the set of tables collectively having fields corresponding to the computed transformations, the query database model strongly indexed on the identified fields of the fact table, and having fewer records in the dimension tables than the corresponding values in the online database.

11. The method of claim 10 further comprising defining a set of query tables, the query tables including a fact table and a plurality of dimensional tables.

12. The method of claim 11 wherein computing the transformation includes transformation logic, further comprising:
mapping attributes form the fields of the online repository to the fields of the query model, the fields corresponding to attributes of the databases; and
generating a command operative to transform the data in the mapped fields from the online repository to the fields of the query model.

13. The method of claim 12 further comprising, defining a star schema structure, the star schema having a central entity corresponding to the fact table, the central entity including a plurality of entries indicative of the designated facts, and further including associated entities representative of dimensions, the associated entities having a substantially smaller number if entries.

14. The method of claim 13 further comprising operating a query engine responsive to a user query and operable to access the generated tables responsive to a received user query.

15. A system including computer storage medium having instructions that, when executed by a processor, cause the computer to perform steps for querying a managed SAN object database comprising:
an online database operable for realtime transactions;
a query database having a fact table and a plurality of dimension tables;
a discriminator operable to select a subset of fields from the SAN object database corresponding to the fact table expected to be queried in a report database, wherein the expected queries comprise SAN activity reports;
a set of transformation routines, the transformation routing operable to map a subset of the attributes from the online database to the query database, further operable to, for each attribute, classify the attribute as a dimension or a fact and
assign, if the attribute is a fact, the attribute to a central metrics table; and
assign, if the attribute corresponds to a dimension, the attribute to a dimension table having an association to the central metrics table;
an extractor operable to periodically extract, from the online database, the data contained in the subset of fields; and
a transformer operable to load, via the transformations, the extracted data to corresponding attributes in the query database the query database strongly indexed on the attributes of the central metrics table, and having fewer records in the dimension tables than the corresponding values in the online database.

16. A data transformation device including computer storage medium for generating a report database comprising:
at least a memory;
at least a processor;
an interface to an online database having a plurality of tables corresponding to a SAN object model;
an extractor operable to enumerate tables for transformation and extract the enumerated tables from the database;
a discriminator operable to select a subset of the queryable fields from the online repository corresponding to multiple fact tables expected to be queried in a report database, wherein the expected queries comprise SAN activity reports and to filter, for each of the tables, unqueried fields to identify a transformation set of tables and attributes within the tables, the transformation set indicative of queryable values;
transformation logic operable to transform via a set of views, the attributes of the transformation set, further operable to, for each attribute, classify the attribute as a dimension or a fact and
assign, if the attribute is a fact, the attribute to a central metrics table; and
assign, if the attribute corresponds to a dimension, the attribute to a dimension table having an association to the central metrics table; and a transformer operable to load the transformed attributes into the corresponding tables in a report database the report database strongly indexed on the attributes of the central metrics table, and having fewer records in the dimension tables than the corresponding values in the online database.

17. The device of claim 16 wherein the transformer includes a loader operable to load the corresponding tables into dimensional tables and a fact table, the dimension tables determined from transformation logic indicative of fields adapted to receive a query.

18. The device of claim 17 wherein the discriminator is further operable to
define transformation logic indicative of a set of views and tables; and
transform, via the transformation logic, attributes in the online database to corresponding attributes in a query DB model, the corresponding attributes including at least one of facts and dimensions.

19. The device of claim 18 wherein the views are SQL views between a plurality of tables, the views indicative of join operations between the enumerated tables and operative to logically link the entries in the tables.

20. The device of claim 18 wherein the transformation logic is further operable to
define an offline set of tables operable to receive the identified plurality of tables, the offline set indicative of queryable values; and
discriminate, from the offline set, fact attributes and dimension attributes; and
generate the query model tables based on the discriminating.

21. A computer program product having a computer storage medium operable to store computer program logic embodied in computer program instructions encoded thereon that, when executed by a processor, cause the computer to perform a method for modeling a storage area network database for report queries, the method comprising:
identifying a plurality of tables in an SAN object model;
enumerating tables for transformation;
selecting a subset of fields from the tables of the SAN object model corresponding to multiple fact tables expected to be queried in a report database, wherein the expected queries comprise SAN activity reports;
extracting the enumerated tables from the database;
identifying a transformation set of tables and attributes within the tables, the transformation set indicative of queryable values;
classifying, for each attribute, the attribute as a dimension or a fact;
assigning, if the attribute is a fact, the attribute to a central metrics table;
assigning, if the attribute corresponds to a dimension, the attribute to a dimension table having an association to the central metrics table;
transforming, via a set of views, the attributes of the transformation set; and
loading the transformed attributes into the corresponding tables in a report database, the report database strongly indexed on the attributes of the central metrics table, and having fewer records in the dimension tables than corresponding values in the online database.

22. A data transformation device for generating a report database comprising:
at least a memory;
at least a processor;
means for identifying queryable fields in an online SAN repository having a plurality of transactions adapted for realtime response;
means for selecting a subset of the queryable fields from the online repository corresponding to multiple fact tables expected to be queried in a report database, wherein the expected queries comprise SAN activity reports;
means for identifying, for each of the queryable fields, whether the queryable field corresponds to a fact or a dimension of transactions stored in the online repository and, for each identified field, classifying the identified field as a dimension or a fact;
means for determining, if the identified field corresponds to a dimension, a corresponding dimensional table to receive the queryable field;
means for designating, if the identified field corresponds to a fact, a corresponding fact table to receive the queryable field;
means for computing a transformation from the identified queryable field to an enumerated field in the corresponding table in the query model; and
means for defining a set of tables including the determined dimensional tables and the designated fact table, the set of tables collectively having fields corresponding to the computed transformations, the set of tables defining a star schema structure, the star schema having a central entity corresponding to the fact table, the central entity including a plurality of entries indicative of the designated facts, and further including associated entities representative of dimensions, the associated entities having a substantially smaller number if entries, the query model strongly indexed on the identified fields of the fact table, and having fewer records in the dimension tables than the corresponding values in the online repository.

* * * * *